Feb. 2, 1971     J. L. MITCHELL     3,559,323

TAG FOR COTTON BALES

Filed June 5, 1969

INVENTOR.
JOSEPH L. MITCHELL
BY
Wm. H. Dean
AGENT

3,559,323
TAG FOR COTTON BALES
Joseph L. Mitchell, Mesa, Ariz., assignor to Texas Tag & Specialty Co., Wolfe City, Tex., a corporation of Texas
Continuation-in-part of application Ser. No. 659,772, Aug. 10, 1967. This application June 5, 1969, Ser. No. 830,691
Int. Cl. G06b 3/14
U.S. Cl. 40—305                                                          6 Claims

ABSTRACT OF THE DISCLOSURE

A tag for cotton bales wherein a paper tag of flat pliable material having a plurality of severable portions and is provided with a relatively rigid adhered section provided with strap receiving openings for holding the tag on a bale of cotton, the relatively rigid tag portion being adhesive and ink pervious so as to permit the printing of large numbers on the first and second tags and to provide for substantial and strong mechanical attachments for the tag relative to a bale of cotton or the like; one of said severable sections also having a string or wire receiving eyelet means.

---

This is a continuation-in-part of my co-pending patent application, Ser. No. 659,772, filed Aug. 10, 1967, and now abandoned.

This invention relates to a tag for cotton bales and more particularly to an identification tag which is adapted to be attached to bales of cotton or the like as they are initially produced and during transportation, inventory and transactions relative thereto.

BACKGROUND OF THE INVENTION

The present invention relates to improvements over a cotton bale tag specifically disclosed in my prior Patent 3,270,453 issued Sept. 6, 1966.

The practicality and economy of attaching suitable tags to bales of cotton or the like incurs many considerations dealing with the attachment of tags to bales of cotton or the like as these bales are produced and subsequent transportation, inventory and transactions relative to the bales.

Tags such as shown in the foregoing patent imply a metal plate having slots to receive a fastening strap for securely holding the tag structure on a bale of cotton or the like. The metal tag structure is relatively expensive and does not lend itself to a simple ink printing process since the tag is not pervious to ink and therefore must be stamped.

In the stamping of metal tags a suitable letter size and contrast may not be available unless printing is employed and when printing occurs on a metal tag, weather or abrasion conditions sometimes obliterate the numbers and therefore make the use of metal tags somewhat more expensive and difficult.

SUMMARY OF THE INVENTION

The present invention employs a pliable flat paper tag having a plurality of severable portions and a relatively rigid tag of tough material which is adhesive and ink pervious secured to the first pliable tag by adhesive material. The relatively rigid tag is provided with a pair of substantially parallel elongated openings for receiving an attachment strap for securing the tag to a bale of cotton or the like, one of said severable portions having a string or wire receiving eyelet therethrough.

The adhesive and ink pervious character of the relatively rigid tag permits emboss printing with ink on the relatively rigid tag so as to provide great contrast in color and large letter size in order that the tag may be durable with respect to retention of the printed numerals thereon, this being true due to the pervious character of the relatively rigid tag. The continued use of the tag in connection with a bale of cotton during the normal transportation, inventory and transactions relative thereto does not remove or erase the numbers from the tag since they are printed into the pervious material of the tag and slightly recessed and imprinted in the surface of the relatively rigid tag.

The adherent relation of the relatively rigid tag to the pliable paper tag provides for a very secure connection of the two tags together and the overall economy of adhering the tags together and printing on both the pliable paper tag and the relatively rigid tag is very favorable. Accordingly, it is an object of the present invention to provide a novel tag for cotton bales comprising a pliable flat paper tag having a relatively rigid and tough adhesive and ink pervious flat tag member continuously and adhesively secured to the pliable paper tag such that corresponding numbers may be printed in contrasting colors on both tags and such that a metal or other suitable strap may be used to secure the pliable paper tag and the relatively rigid tag to a bale of cotton or the like.

Another object of the invention is to provide a novel tag for cotton bales or the like comprising a pliable flat paper tag having a relatively tough and rigid adhesive and ink pervious flat tag member contiguously and adhesively secured thereto and wherein strap receiving openings extend through both tags in corresponding alignment to receive the attachment strap for holding the tag structure of the invention in connection with a bale of cotton or the like.

DESCRIPTION OF THE PREFERRED EMBODIMENTS

Figure 1:
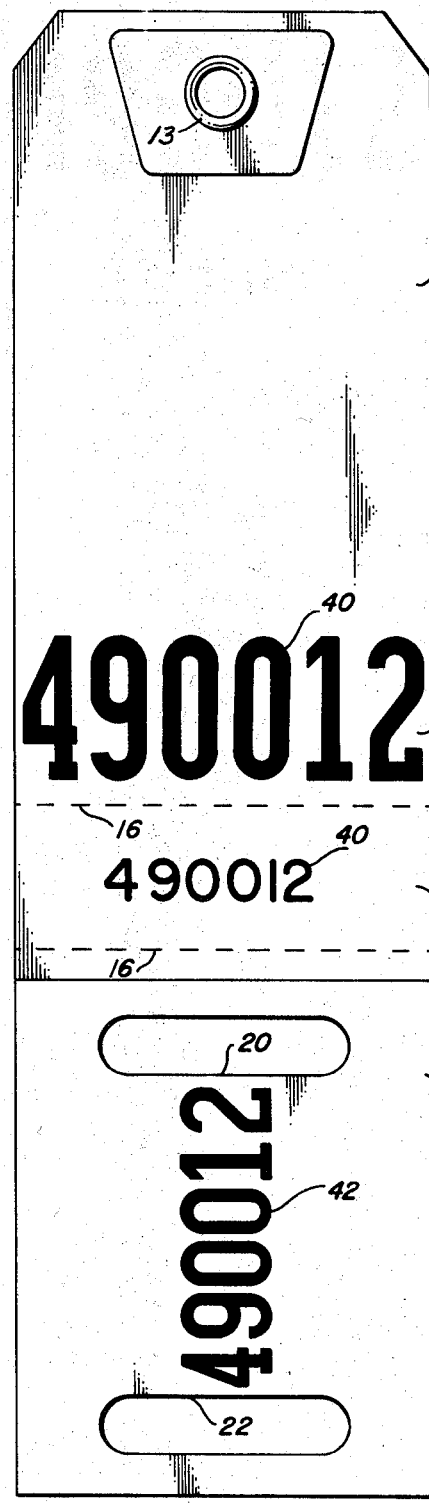
FIG. 1 is a side elevational view of a tag for cotton bales or the like in accordance with the present invention.

As shown in FIG. 1 of the drawings, the invention comprises a first flat pliable paper tag 10 having a plurality of severable sections 12 and 14, these being severable at perforated portions 16 extending transversely of the longitudinal axis of the tag 10. The portion 12 of the tag 10 is provided with a reinforced metal eyelet 13 extending through the tag portion 12 and adapted for use in securing the tag portion 12 to the bagging about a bale of cotton by inserting a wire or string through the eyelet 13 and the bagging around the bale for securing the tag portion 12 to a different area of the bale than the tag portion 18, as will be hereinafter described.

A relatively rigid and tough second tag member 18 is preferably made of fiberboard or the like and is adhesively secured onto the pliable paper tag 10. This tag 18 is provided with elongated strap receiving openings 20 and 22 extending therethrough and through corresponding openings in the pliable paper tag 10. The tag 18 has the longitudinal disposition of the elongated openings 22 disposed transversely of the longitudinal axis of the paper tag 10.

Figure 2:
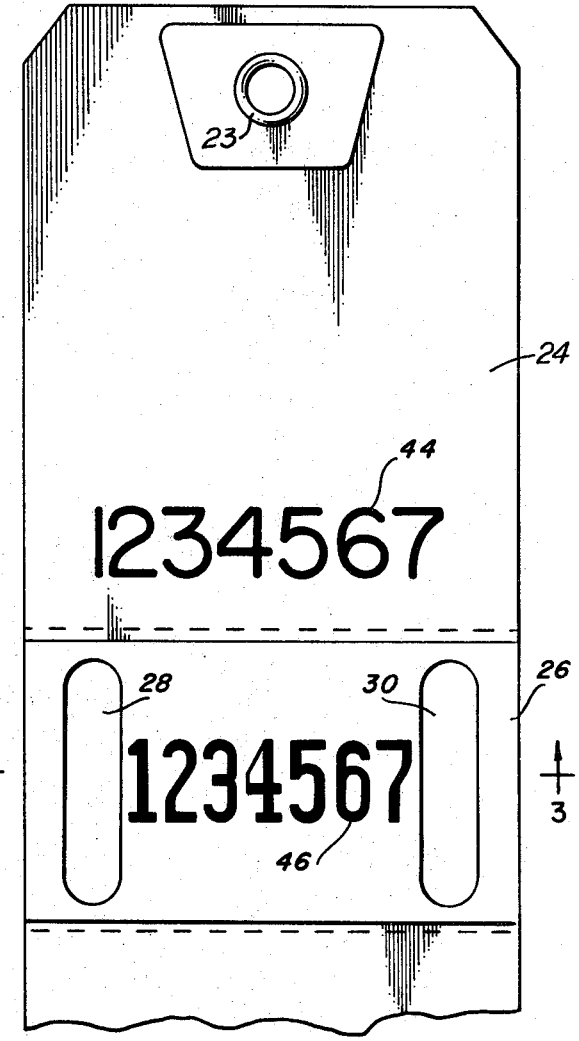
FIG. 2 is a fragmentary view of a tag similar to that shown in FIG. 1 but showing a pliable paper tag having a relatively rigid tag secured thereto at a different angle than that shown in FIG. 1 of the drawings.

A modification of the invention as shown in FIG. 2 includes a pliable paper tag 24 similar to the tag 10 and a relatively rigid tag 26 similar to the tag 18. The tag 26 has elongated strap receiving openings 28 and 30 spaced apart and having their longitudinal axes disposed parallel to the longitudinal axis of the tag 24. The openings 20 and 22 as well as the openings 28 and 30 are spaced apart at right angles to the longitudinal axes of their elongated disposition.

Figure 3:
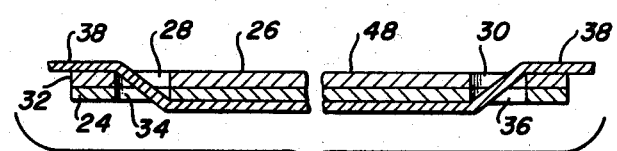
FIG. 3 is a fragmentary sectional view taken from the line 3—3 of FIG. 2.

The structure as shown in FIG. 3 represents a cross section of the structure as taken from the line 3—3 of FIG. 2 and also corresponds with the structure of the tag 10 and the tag 18.

The tag 26 being provided with the openings 28 and 30 is adhesively secured at 32 to the pliable tag 24 and this tag 24 is provided with openings 34 and 36 which are aligned with the respectively openings 28 and 30. A metal strap 38 passes through the openings 28 and 34 and the openings 30 and 36 and may be extended around a bale of cotton or the like and fastened thereon to hold the tags 24 and 26 securely in connection with the bale.

It will be understood that a metal strap 38 may be used in the same manner with respect to the tags 10 and 18 and the separable portions 12 and 14 may be torn away and withdrawn from beneath the strap as it extends around the bale.

It will be seen that an eyelet 23 is secured to the tag portion 24, as shown in FIG. 2 of the drawings, and this eyelet portion 23 is similar to the eyelet 13, shown in FIG. 1 of the drawings.

The tag 10 is provided with large printed numbers 40 on all of its separable sections and corresponding numbers 42 are printed on the tag 18. Likewise, the tag 24 is provided with numbers 44 and the tag 26 is provided with corresponding numbers 46.

The numbers 46 are printed on the pervious material of this tag and on its face 48 and may be slightly impressed therein, the ink or other printing material penetrating the surface of the relatively rigid pervious tag which is made of heavy tough fiberboard or paper.

It will be appreciated by those skilled in the art that the adhesive and ink pervious members 18 and 26 adhered to the relatively pliable paper tag members provide for securing the tag to a bale of cotton or the like by a suitable strap and also provide for good adhesion of the rigid tag to the relatively pliable tag and further permit very substantial numeral printing which is durable with relation to these tag members and especially the relatively rigid tag such that normal handling and weather does not obliterate the numbers on the tag.

It will be obvious to those skilled in the art that various modifications of the invention may be resorted to in a manner limited only by a just interpretation of the following claims.

I claim:
1. In a tag for cotton bales the combination of: a first pliable flat paper tag having a plurality of severable sections; a second relatively rigid and tough adhesive and ink pervious flat tag contiguously and adhesively secured to said first pliable flat paper tag; said first and second tags each having a pair of elongated spaced apart strap receiving openings, said elongated openings being longitudinally parallel and spaced apart; said openings in said first tag coinciding with said openings in said second tag; one of said severable sections having an eyelet means extending therethrough and adapted to receive a wire or string connecting said severable section independently relative to means used in relation to said elongated openings.

2. The invention, as defined in claim 1, wherein: said severable sections of said first tag and said second tag having ink pervious printed portions bearing corresponding printed numerals.

3. The invention as defined in claim 2, wherein: said first tag is elongated along a first axis, said strap receiving openings being longitudinally parallel to said first axis.

4. The invention as defined in claim 2, wherein: said first tag is elongated along a first axis, said strap receiving openings longitudinally disposed at right angles to said first axis.

5. The invention as defined in claim 3, wherein: said first tag is severable between said sections thereof at right angles to said first axis.

6. The invention as defined in claim 4, wherein: said first tag is severable between said sections thereof at right angles to said first axis.

References Cited
UNITED STATES PATENTS

| | | | |
|---|---|---|---|
| 164,165 | 6/1875 | Goldsmith | 40—305X |
| 1,052,865 | 2/1913 | Ward | 40—2X |
| 1,458,444 | 6/1923 | Scott | 40—27X |
| 3,270,453 | 9/1966 | Mitchell | 40—305 |

WILLIAM H. GRIEB, Primary Examiner

U.S. Cl. X.R.

40—27